UNITED STATES PATENT OFFICE.

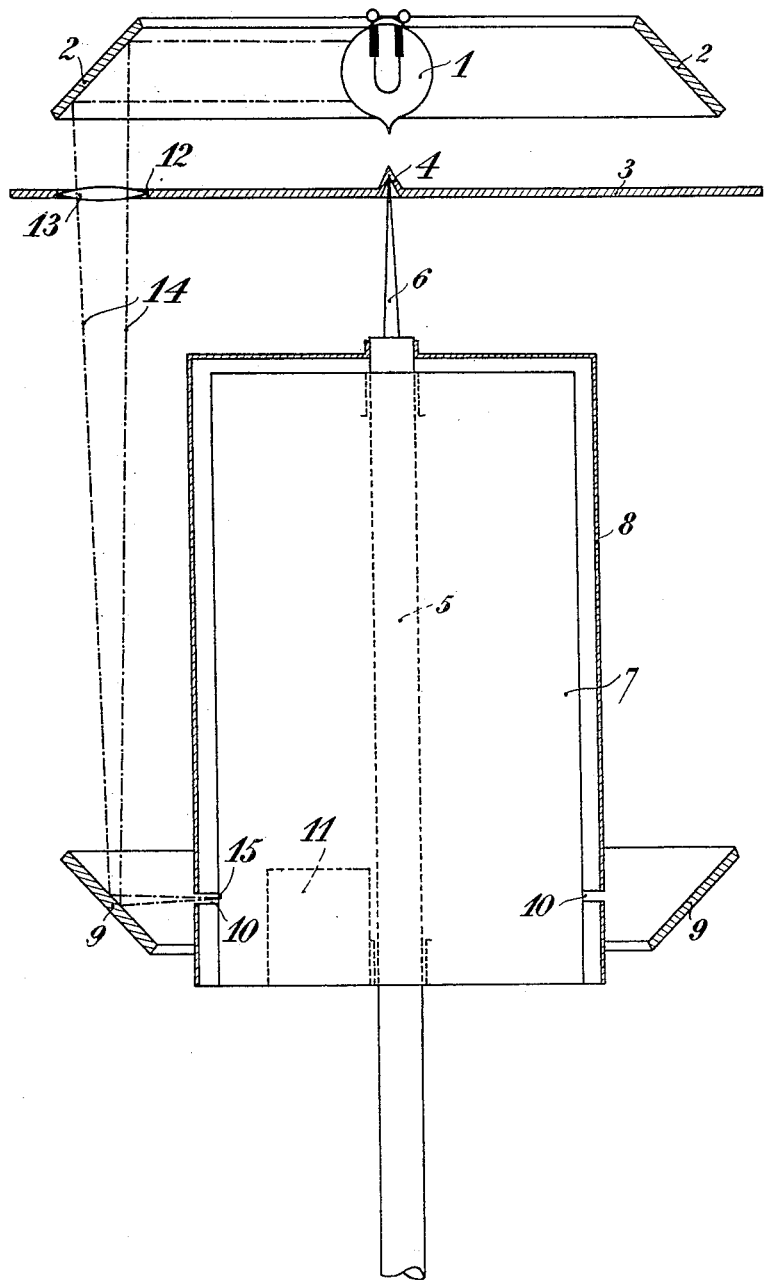

ANDREAS BENDIX CHRISTIAN THOMSEN, OF COPENHAGEN, DENMARK.

SELF-REGISTERING COMPASS.

1,120,565.  Specification of Letters Patent.  Patented Dec. 8, 1914.

Application filed April 8, 1912. Serial No. 689,446.

*To all whom it may concern:*

Be it known that I, ANDREAS BENDIX CHRISTIAN THOMSEN, of No. 19 Knabrostraede, Copenhagen, in the Kingdom of Denmark, mechanical engineer, have invented certain new and useful Improvements in Self-Registering Compasses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide a compass with means for photographic registration of the course.

The invention consists in the compass-card or a circular screen, which follows the movements of the compass-needle, being inserted between a source of light and a photographic apparatus and further in the arrangement of photographic paper or a like upon a cylindrical surface co-axially with the compass-card and which is movable in the direction of the axis, and a mirror on which the light from the light-source may penetrate through an aperture in the compass-card or the screen and be thrown upon the photographic paper. During the relative turnings of the compass-needle, the beam of light and its point of record upon the cylinder is moved, the cylinder at the same time making a constant axial movement. The said point of record consequently describes a line which at all times is the resultant of the two movements. The first tangential movement indicates course-alteration, the other axial and constant movement indicates the time during which the alteration takes place. If, during the time the cylinder uses for fulfilling its axial travel, the vessel has moved in a circle the recording point of the beam will describe a helix. If, on the other hand, during the whole time of registration the vessel has kept its course unaltered, the recording point will move along a generatrix of the cylinder. If the vessel is tacking, the photo will show a zigzag line.

As the mirror of the camera must be able to act at any angular turning of the aperture or of the said reflecting body, it must either participate in the said movements, and, if desired constitute itself the above-mentioned special light-reflecting body, or the cylinder must be surrounded by a belt of mirrors or arranged within one single circular mirror, preferably of conical or spherical shape. On the other hand the light from the light source must be able to fall through the aperture or upon the special light-reflecting body at all angular positions of the compass-needle. This requirement is complied with if the light falls evenly upon the compass-card or the screen or upon the path on which the light aperture or the special light-reflecting body moves. A lens may be inserted in the path of the light.

A form of construction of the invention is shown on the accompanying drawing.

The light-source with appurtenant conical mirror is shown arranged on the one side of (that is to say above) the compass-card, and the paper-cylinder with its conical mirror is shown arranged on the other side (that is to say below) the compass-card. But, this arrangement is not absolutely necessary. The light-source and the photographic paper or the like may by using a special screen for the light-aperture or by using the special light-reflecting body both be arranged on the same side of the compass-card or the compass-needle, either above or below it.

1 is the lamp, 2 the conical mirror for same, 3 the compass-card, 4 its swivel point, 5 the support with the pivot 6, 7 the paper-cylinder, axially movable along the support 5, 8 a mantle fixed to the support and surrounding the cylinder 7, 9 the other conical mirror which surrounds the mantle 8 outside a circular slit 10 or a series of holes in said mantle, 11 the escapement which insures the fall of the paper-cylinder within the fixed time, say 4 hours, or if desired, 12 or 24 hours, 12 the light-aperture and 13 a lens in same. The lines 14 indicate the path of the effective light. 15 is the point of record of the light-beam.

I claim—

1. The combination with a compass card and a lens carried thereby; of a non-rotatable, axially movable photographic recording strip co-axial with said card, and a conical stationary reflector arranged to receive a beam of light passing through the lens and reflect it onto said strip.

2. The combination with a compass card, a source of light above the same, and a conical reflector surrounding the source of light; of a lens in the card arranged to receive light reflected from said reflector, a non-rotatable, axially movable photographic recording surface concentric with said card, and a stationary conical reflector surrounding said surface and arranged to reflect light from said lens to the strip.

3. The combination with a compass card, a lens carried thereby, a source of light above the card and a reflector arranged to reflect light from said source to the lens under all conditions of operation; of a non-rotatable, axially movable photographic recording surface, a mantle having a peripheral slot and a reflector arranged to receive a beam of light from said lens and direct it through the slot onto the surface.

In testimony that I claim the foregoing as my invention, I have signed my name in presence of two subscribing witnesses.

ANDREAS BENDIX CHRISTIAN THOMSEN.

Witnesses:
ERNEST BOUTARD,
P. HOFMAN-BANG.

Copies of this patent may be obtained for five cents each, by addressing the "Commissioner of Patents, Washington, D. C."